US009037142B2

(12) United States Patent
Jovanovic et al.

(10) Patent No.: US 9,037,142 B2
(45) Date of Patent: May 19, 2015

(54) CELL PLANNING METHOD FOR WIRELESS COMMUNICATION SYSTEMS

(71) Applicant: Newfield Wireless, Berkeley, CA (US)

(72) Inventors: Vladan Jovanovic, Overland Park, KS (US); Stefan Scheinert, Vista, CA (US)

(73) Assignee: Tektronix, Inc., Beaverton, OR (US)

( * ) Notice: Subject to any disclaimer, the term of this patent is extended or adjusted under 35 U.S.C. 154(b) by 53 days.

(21) Appl. No.: 13/951,703

(22) Filed: Jul. 26, 2013

(65) Prior Publication Data

US 2014/0031047 A1    Jan. 30, 2014

Related U.S. Application Data

(60) Provisional application No. 61/741,835, filed on Jul. 30, 2012.

(51) Int. Cl.
*H04W 16/04* (2009.01)
*H04W 24/02* (2009.01)
*H04W 16/20* (2009.01)

(52) U.S. Cl.
CPC .............. *H04W 16/04* (2013.01); *H04W 16/20* (2013.01); *H04W 24/02* (2013.01)

(58) Field of Classification Search
CPC ...... H04W 16/04; H04W 24/02; H04W 16/20
USPC ............. 455/403, 422.1, 432.1, 435.1, 435.2, 455/436–444, 446, 450, 452.1, 452.2, 453, 455/456.1–456.6; 370/328, 331–334
See application file for complete search history.

(56) References Cited

U.S. PATENT DOCUMENTS

| | | | |
|---|---|---|---|
| 6,477,367 B1 | 11/2002 | Kim | |
| 8,619,708 B2 * | 12/2013 | Kallin et al. | 370/331 |
| 2009/0318132 A1 | 12/2009 | Chiou et al. | |
| 2011/0223918 A1 * | 9/2011 | Dahlen et al. | 455/436 |
| 2011/0294499 A1 | 12/2011 | Vikberg et al. | |
| 2012/0142347 A1 * | 6/2012 | Morad et al. | 455/435.1 |

* cited by examiner

*Primary Examiner* — Ajit Patel
(74) *Attorney, Agent, or Firm* — Locke Lord LLP; Scott D. Wofsy; Christopher J. Capelli

(57) ABSTRACT

A method for estimating how best to position a new cell within an existing overloaded cell that is running out of capacity in a wireless network so as to optimize the offloading of capacity from the overloaded cell includes: filtering call records to keep calls made during a selected capacity planning interval calls and performing one or more of sending data to the overloaded cell and receiving data from the overloaded cell; geo-locating the sending and receiving calls; calculating one or more resource utilization values for one or more geo-located sending and receiving calls; and determining coordinates for an optimum new cell location so as to optimize the offloading of capacity from the existing overloaded cell.

20 Claims, 4 Drawing Sheets

CELL PLANNING METHOD FOR WIRELESS COMMUNICATION SYSTEMS

PRIORITY CLAIM

The present application claims the priority benefit of U.S. provisional patent application No. 61/741,835 filed Jul. 30, 2012 and entitled "New cell Planning Method for Wireless Communication Systems," the disclosure of which is incorporated herein by reference.

BACKGROUND

The present invention relates to a planning method for positioning a new cell in an existing wireless network and, more particularly, to a planning method for estimating how best to position a new cell within an existing overloaded cell that is running out of capacity in a wireless network so as to optimize the offloading of capacity.

SUMMARY

According to embodiments of the invention, a method for estimating how best to position a new cell within an existing overloaded cell that is running out of capacity in a wireless network so as to optimize the offloading of capacity from the overloaded cell includes: filtering call records to keep calls made during a selected capacity planning interval calls and performing one or more of sending data to the overloaded cell and receiving data from the overloaded cell; geo-locating the sending and receiving calls; calculating one or more resource utilization values for one or more geo-located sending and receiving calls; and determining coordinates for an optimum new cell location so as to optimize the offloading of capacity from the existing overloaded cell.

According to further embodiments of the invention, a method for estimating how best to position a new cell within an existing overloaded cell that is running out of capacity in a wireless network so as to optimize the offloading of capacity from the overloaded cell includes: filtering call records to keep calls made during a selected capacity planning interval calls, wherein the kept calls are performing one or more of sending data to the overloaded cell and receiving data from the overloaded cell; geo-locating the sending and receiving calls; calculating one or more resource utilization values for one or more geo-located sending and receiving calls; initializing N new cell locations using new cell parameters; predicting new cell coverage for the N new cell locations; determining best server areas for the overloaded cell and for one or more of the N new cells; computing resource utilization values for the overloaded cell and for one or more of the N new cells; determining the capacity to be offloaded from the overloaded cell; determining that the offloaded capacity is maximized; determining that resource utilization values for the overloaded cell and for the N new cells are below predefined target values; and outputting the present N new cell locations and their cell parameters as an optimum solution.

A non-transitory computer-readable storage medium includes instructions for estimating how best to position a new cell within an existing overloaded cell that is running out of capacity in a wireless network so as to optimize the offloading of capacity from the overloaded cell, wherein the instructions, upon execution, cause a processor to perform actions including: filtering call records to keep calls made during a selected capacity planning interval calls and performing one or more of sending data to the overloaded cell and receiving data from the overloaded cell; geo-locating the sending and receiving calls; calculating one or more resource utilization values for one or more geo-located sending and receiving calls; and determining coordinates for an optimum new cell location so as to optimize the offloading of capacity from the existing overloaded cell.

DETAILED DESCRIPTION

Figure 1:
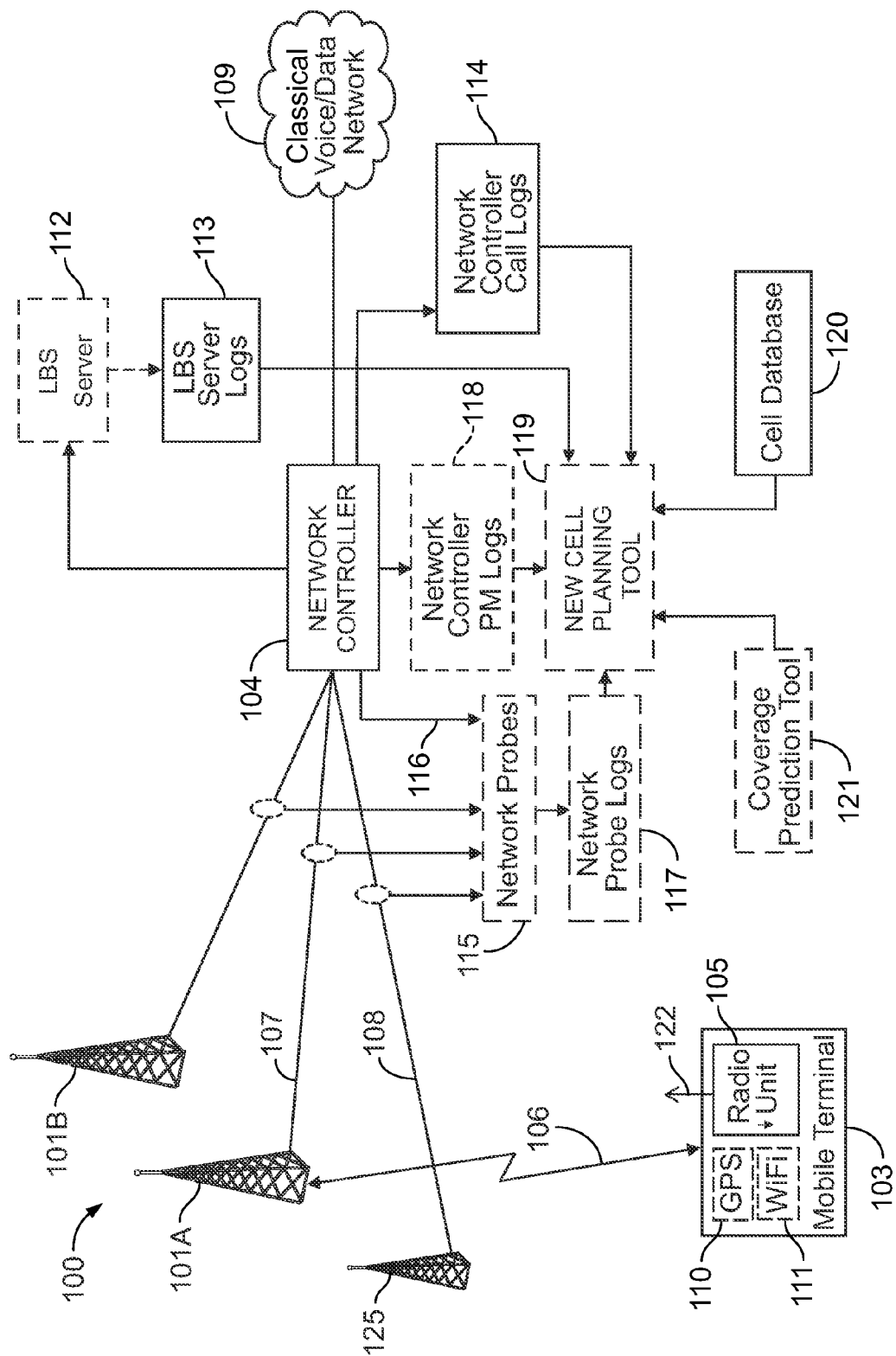
FIG. 1 is a conceptual representation of the wireless network, indicating various adjunct network elements that may create data sources that may be used as inputs by the method for estimating how best to position a new cell within an existing overloaded cell that is running out of capacity in a wireless network so as to optimize the offloading of capacity from the existing overloaded cell.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

Conventional wireless cellular telephone networks were designed to provide coverage for a given area, so that rather large cells (for example, cells with radii equal to at least approximately one mile up to at least approximately five miles) were originally positioned in such a way that coverage was optimal. More recently, network usage has been growing and capacity issues have been frequently arising, especially due to enormous increases of the data traffic.

To a significant extent, present capacity problems arise from the fact that cells originally deployed for coverage do not deal efficiently with traffic hotspots in the networks, which tend to be quite localized. This localization is twofold: most of the traffic demand appears in a relatively small number of the deployed cells, and also within a rather small area of the coverage of the overloaded cells.

One of the most promising approaches to deal with the explosive traffic growth relies on the concept of heterogeneous networks, in which the overloaded cells originally deployed for coverage are combined with the strategically positioned new small cells specifically targeted to provide capacity offload for hotspots within the overloaded cells. Small cells may, for example, have radii between approximately 0.1 miles and approximately 0.2 miles. New cells can be one or more of new small cells and new macrocells.

Small cells may cover one or more of a variety of practical implementations such as microcells, picocells, femtocells, Distributed Antenna Systems (DAS), Remote Radio Heads (RRH), various forms of Relay and Repeater cells, and the like.

In early voice systems, small cells were often deployed so as to cover the areas with the highest densities of subscriber terminals. Somewhat better results could be obtained if the call lengths were also taken into account, which corresponds to selecting areas with the highest traffic (Erlang) density levels.

In both cases, the best results are obtained by geographically locating the terminal position for calls. Various approximate methods were also proposed in the past, whereby the network-measured cell traffic was distributed over the cell coverage area based on assumptions about relative densities of subscribers in various different environments. Examples of different environments include urban, suburban, residential, open, and the like. The term clutter classes is used to describe the different environments.

In data systems, terminal density and connection lengths are not good indicators of data traffic because two subscriber terminals may require vastly different data throughputs. Ratios of data throughputs in different terminals may be as high as approximately 100 to 1. For example, a ratio of approximately this amount may result from comparing a subscriber who is watching High Definition (HD) video to a subscriber making a voice call using Voice over Internet Protocol (VoIP) service.

A further problem for planning in all modern wireless data networks is that the networks offer the option to adapt the Physical (PHY) Layer data rates in accordance with the Radio Frequency (RF) conditions on each subscriber's wireless link. For example, networks offer the option to adapt the PHY Layer data rates in accordance with the signal-to-noise plus interference ratio (SINR). In some cases, data rates can also vary based on the Quality of Service (QoS) that a subscriber desires or that a service requires.

Adaptation of the PHY Layer is usually achieved by selecting different modulation formats. For example, modulation formats that may be selected include BPSK, QPSK, 16QAM, and 64QAM. Additionally, coding rates may be selected for forward-error-correction (FEC) schemes. In some cases, automatic repeat request (ARQ) procedures appropriate to the measured RF conditions may be used.

Overall PHY layer data rates for transmission of data may vary between the base station and the mobile station by a ratio of approximately 50 or more. Such large ratios may cause vastly different requirements for PHY Layer resources. Vastly different requirements of PHY Layer resources may apply even for two subscribers using the same type of service, depending on the respective RF conditions of their respective terminals.

According to embodiments of the invention, the best location is estimated at which to position a new cell within an existing overloaded cell to achieve optimum capacity offload. The estimate is performed by selecting a geographic location within the coverage of the overloaded cell at which the new cell may be positioned so as to maximize the quantity of PHY Layer resources of the overloaded cell that will be comprised within the new cell coverage area. New cell parameters may also be included in this optimization. For example, one or more of coordinates within the overloaded cell coverage area, antenna height, antenna radiation pattern, antenna gain, transmit power, handoff parameters, and other cell selection parameters may be included in the optimization. For example, an overloaded cell might be operating, prior to the offload, as approximately 95% of its capacity. If for example, the new cells are able to effect an offload of approximately 45% of its capacity, then after the offload, the previously overloaded cell will be operating at a much more comfortable 50% of its capacity.

The definition of PHY Layer resource utilization depends on the access technology used by the wireless system. For wireless systems using one or more of Frequency Division Multiple Access (FDMA) and Time Division Multiple Access (TDMA), resource utilization may be determined based on the number of carriers or time slots used during each call. For wireless systems using Orthogonal Frequency-Division Multiple Access (OFDMA), and therefore combining FDMA and TDMA principles, resource utilization may be determined based on the number of minimum assignable units in terms of one or more of time and frequency. For example, in the Long-Term Evolution (LTE) setting, resource utilization may be determined from Physical Resource Blocks (PRBs). For example, in the Worldwide Interoperability for Microwave Access (WiMAX) setting, resource utilization may be determined from one or more of Clusters used during a call and Tiles used during a call. In Code Division Multiple Access (CDMA) systems, resource utilization may be measured as a portion of the cell's total transmit energy that was used for a particular call.

According to embodiments of the invention, resource utilization models may take into account one or more of traffic demands generated by subscribers, and the PHY layer data rates allowed by RF conditions at the subscribers' terminals. New cell offload according to embodiments of the invention minimizes the blocking rate for services that require guaranteed bit rate (GBR services), while maximizing the throughput available for subscribers using a best-effort (BE, or non-GBR) service.

FIG. 1 is a conceptual representation of the wireless network, indicating various adjunct network elements that may create data sources that may be used as inputs by the method for estimating how best to position a new cell within an existing overloaded cell that is running out of capacity in a wireless network so as to optimize the offloading of capacity from the existing overloaded cell.

As depicted in FIG. 1, a wireless network (WN) 100 comprises cells 101A and 101B, a mobile terminal (MT) 103, and a Network Controller (NC) 104. For purposes of this example, and to promote clarity, we will show how embodiments of the invention may be used for estimating how best to position a new cell within an existing overloaded cell 101A, which is assumed to be running out of capacity, so as to optimize the offloading of capacity from existing overloaded cell 101A. The overloaded cell 101A may be either an overloaded macrocell 101A or an overloaded small cell 101A.

The MT 103 comprises an antenna 122 and a radio unit 105 that enable wireless connections to one or more of cells 101A and 101B via a radio frequency (RF) channel 106, which allows for bidirectional transmission of one or more of voice and data between the MT 103 and the overloaded cell 101A, and also allows for bidirectional transmission of one or more of voice and data between the MT 103 and the cell 101B. Information from the overloaded cell 101A is then routed to the NC 103 over fixed backhaul links 107, 108. The NC 103 provides further connectivity to a classical (non-wireless) voice and data network 109.

The MT 103 may optionally comprise a separate Global Positioning System (GPS) radio unit 110 for receiving GPS signals. When present, the GPS radio unit 110 may be used by the MT 103 to assist in determining its geographical position. The MT 103 may optionally comprise a separate Wireless Fidelity (Wi-Fi) radio unit 111 for receiving Wi-Fi signals. When present, the separate Wi-Fi radio unit 111 may be used by the MT 103 to assist in determining its geographical position. Geo-location data may be sent from the MT 103 to the NC 104 via a wireless RF channel 106. For example, the geo-location data may comprise one or more of latitude, longitude, altitude, some measure of the estimated location errors, and the like. Other information may be sent from the MT 103 to the NC 104 via the wireless RF channel 106. For example, the MT 103 may send information comprising one or more of a time of making the estimate, an MT identity, a subscriber identity, and PHY layer measurements. Optionally, the WN 100 may further comprise a Location Based Services (LBS) server 112. The NC 104 may forward the geo-location data to the LBS server 112. To further assist with geo-location, the NC 104 may forward the other information to the LBS server 112, The NC 104 may also forward to the LBS server 112 one or more of PHY layer measurements made by the NC 104, and the PHY layer measurements received from the MT 103, to the LBS server.

The LBS server 112 may provide special services to the subscriber. For example, the LBS server may provide one or more of turn-by-turn navigation and correct routing of emergency calls. The LBS server 112 may additionally generate LBS Server Logs 113. The LBS Server Logs 113 may list the location of the MT 103 that have provided their location information to the LBS 112.

During a voice or data call, the MT 103 and overloaded cell 101A may exchange messages. The messages exchanged by the MT and the overloaded cell 101A may relate to one or more of the initiation of the connection, the release of the connection, the data rates to be used for the connection, and the like. In order to provide substantially continuous service as the MT 103 moves through the area, calls may be transferred between different cells 101A and 101B. For example, calls may be transferred between different cells 101A and 101B via a handoff.

To facilitate handoffs, in all access technologies, the MT 103 provides Physical Layer measurements to the NC 104 regarding overloaded cell 101A. For example, the MT 103 provides to the NC 104 one or more of power level measurements for signals; signal-to-noise (SNR) ratios measurements for signals coming from different cells; and in some cases also the Observed Time Differences of Arrival (TDOAs).

In most WNs 100, information about various events that occurred during each call is recorded and summarized in the Network Controller logs 114. Network Controller logs 114 are also known as Call Detailed Logs, Call Detailed Records and Per Call Measurement Data. The information recorded and summarized in the Network Controller logs may comprise one or more of measurements reported by the MT 103 and PHY Layer measurements by overloaded cell 101A. The measurements may comprise one or more of cell-received powers, Round Trip Times (RTT), and the like.

Optionally, the WN 100 may comprise a Network Probe 115. Detailed records describing a call can be captured by the Network Probe 115, which is able to decode the relevant messages by passively monitoring ("sniffing") the backhaul links 107, 108. The Network Probe 115 can capture the same information by passively monitoring standardized interfaces 116 between the Network Probe 115 and the NC 104. For example, the standardized interfaces may comprise one or more of a mobility manager, a gateway, a radio network controller, a base station controller, an operations support system, and the like. The Network Probe 115 can process the captured information and can generate a Network Probe Log 117. One of more of the LBS server logs 113 and the Network Probe Log 117 may then be used for further processing, similar to the NC call logs 114.

Optionally, the WN 100 may comprise NC Performance Measurements (PM) logs 118. The NC 104 is operably connected to the NC PM logs 118. The NC PM logs 118 are also called Service Measurements logs 118. The NC PM logs 118 collect one or more of information describing call events, PHY Layer measurements, and resource utilization statistics. The NC PM logs 118 serve as primary sources of information for one or more of assessment of overall cell performance, identification of network problems, capacity planning, and the like. Unlike the NC call logs 114 and the Network Probe Logs 117, which are typically configured to record information on a per-call basis, the NC PM logs 118 are network element (e.g. cell) based to list information describing one or more network elements over a time interval of interest. For example, the NC PM logs 118 may be configured to list information describing one or more network elements over an hour.

Optionally, the WN 100 may comprise a standalone New cell Planning Tool 119. The embodiment depicted in FIG. 1 comprises a standalone computing and processing NCPT 119. Alternatively, the NCPT 119 may, for example, be comprised in one or more of the NC 104, the LBS Server 112, and the Network Probe 115.

The NCPT 119 may take as inputs one or more of the server logs 113, the NC call logs 114, the Network Probe logs 117, and the NC PM logs 118. The NCPT 119 may also take as inputs an optional Cell Database 120. When present, the Cell Database 120 comprises information about existing cells 101A and 101B in the WN 100. For example, regarding existing macrocells 101A and 101B, the Cell Database 120 may comprise one or more of geographical coordinates, antenna type, antenna height, one or more receiver parameters, one or more transmitter parameters, and one or more power settings.

The NCPT 119 may also take as inputs an optional Coverage Prediction Tool 121. The Coverage Prediction Tool 121 may be used to estimate—after the proposed new cell is introduced into the WN 100—one or more of the coverage area of the newly proposed new cell, RF parameters of the proposed new cell, data rates of the proposed new cell, RF parameters of the overloaded cell, RF parameters of the new cell after a new cell is introduced in the WN Commercially available Coverage Prediction Tools 121 include Atoll, manufactured by Forsk (www.forsk.com) of Blagnac, France, and Mentum Planet, manufactured by InfoVista of Paris, France.

Using the inputs, the NCPT 119 determines coordinates for a new cell 125 based on an estimate as to how best to position the new cell 125 within the existing overloaded cell 101A that is running out of capacity in the WN 100 so as to optimize the offloading of capacity from the existing overloaded cell 101A.

Figure 2:
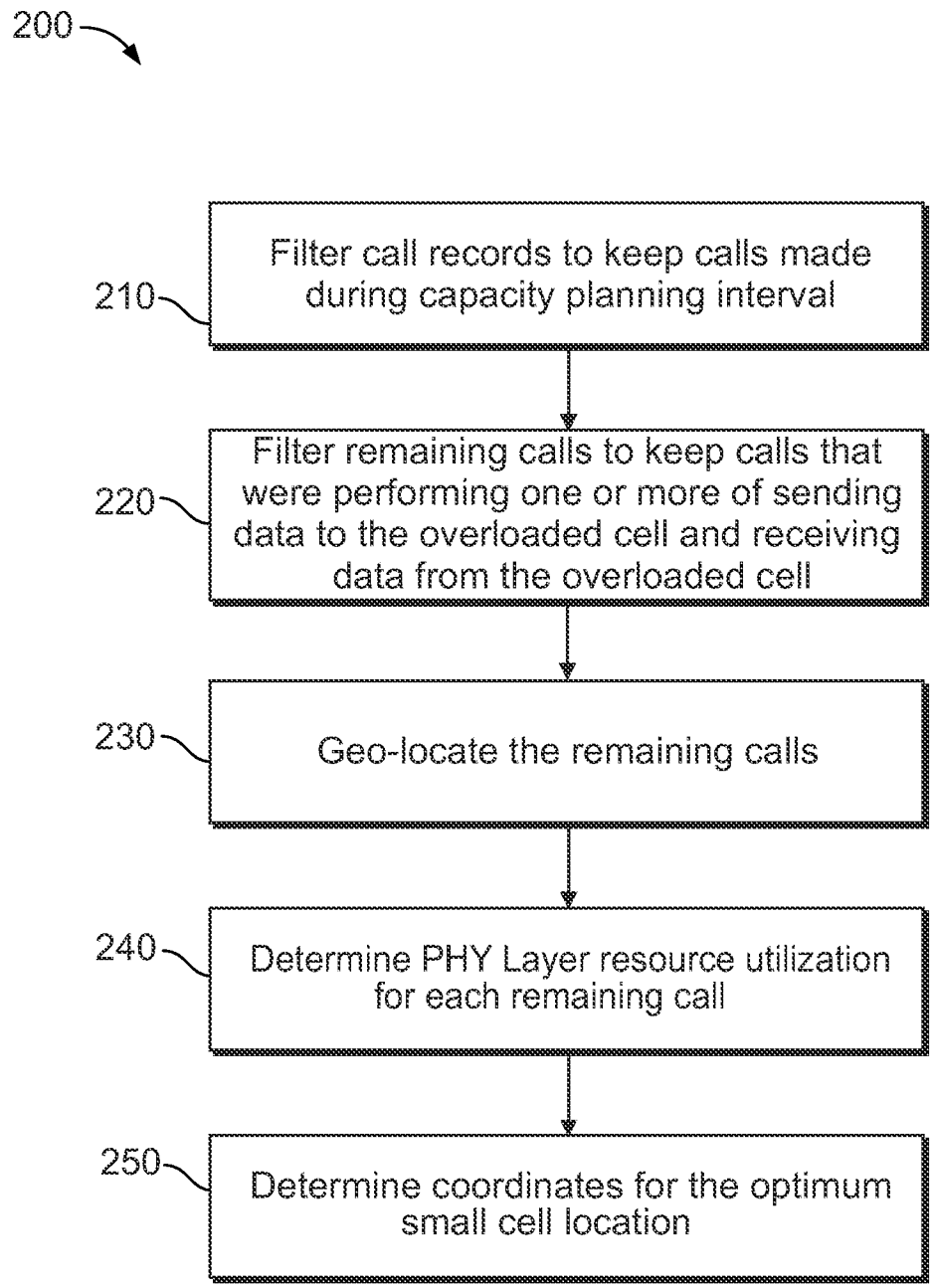
FIG. 2 is a flowchart showing steps in a method for estimating how best to position a new cell within an existing overloaded cell that is running out of capacity in a wireless network so as to optimize the offloading of capacity from the existing overloaded cell.

FIG. 2 is a flowchart showing steps in a method 200 for estimating how best to position a new cell within an existing overloaded cell that is running out of capacity in a wireless network so as to optimize the offloading of capacity from the existing overloaded cell.

FIG. 2 also shows how various input data sources may be processed to prepare the data so that it may be used by the disclosed method for estimating how best to position a new cell within an existing overloaded cell that is running out of capacity in a wireless network so as to optimize the offloading of capacity from the existing overloaded cell.

According to embodiments of the method, the overloaded cell may be either an overloaded macrocell or an overloaded small cell.

In block 210, call records coming into the NCPT are filtered to keep the ones belonging to a capacity planning interval that was previously selected by a network operator or other user. The capacity planning interval may be, for example, one or more of a system busy hour, a bouncing busy hour, a daily total of e.g. 7 for days of interest, and averages of these quantities over a number of different days, potentially including both weekend days and weekdays depending on the operator's interests. The capacity planning interval may be determined in reference to the wireless operator's objectives with respect to one or more of Quality of Service (QoS) and Quality of Experience (QoE).

The LBS Server logs, the NC call logs, the Network Probe Logs, and the NC PM logs coming into the NCPT tool may contain all calls during the capacity planning interval. The method can also be applied to a subset of all calls, provided that the subset is representative. A subset will tend to be representative if the size of the subset is statistically significant. Block 210 then transfers control to block 220.

In block 220, the calls remaining after block 210 are filtered so as to keep those calls that were performing one or more of sending data to the overloaded cell that is to be offloaded and receiving data from the overloaded cell that is to be offloaded. This may be done based on cell identities, which may be provided within one or more of the NC call logs, the Network Probe logs, and the NC PM logs. Block 220 then transfers control to block 230.

In block 230, remaining calls are geo-located. In some embodiments, the required information may be readily available in the LBS logs.

If the LBS logs do not contain the location estimates for all of the calls, additional geo-location may be performed within the NCPT itself, using the information available from one or more of the NC call logs, the Network Probe logs, and the NC PM logs. Alternatively, the NCPT can interface with an adjunct tool that provide geolocated call maps, using information elements that may be obtained from one or more of the NC call logs, the Network Probe logs, and the PM logs. For example, these information elements may include one or more of RTT, OTDOA, measured angles-of-arrival (AoA), measured powers or SNR levels from one or more of the overloaded serving cell and from neighboring cells. For example, the NCPT can interface with TrueCall, manufactured by Newfield Wireless (www.newfieldwireless.com) of Berkeley, Calif. Block 230 then transfers control to block 240.

In block 240, the PHY Layer resource utilization is determined for one or more of the remaining calls. In the LTE setting, the resource utilization may be expressed, for example, in terms of a total number of PRBs used for information transfer. In the WiMAX setting, the resource utilization may be expressed, for example, by a number of clusters and tiles. In 1x Evolution-Data Optimized (EV-DO) systems, the resource utilization may be expressed, for example, by the number of slots utilized on downlink. In settings of Universal Mobile Telecommunciations System (UMTS) or Third Generation, 144 kbps Wireless Technology (3G1X) systems, and the like. the resource utilization may be expressed, for example, as downlink transmit power. For the uplink of UMTS or 1xEV-DO systems, determining the resource utilization of resources is more involved and should include measurement of the portion of noise rise at the cell receiver that is attributable to each particular call. Block 240 then transfers control to block 250.

In block 250, coordinates are determined for the optimum location for the new cell within the existing overloaded cell that is running out of capacity in a wireless network so as to optimize the offloading of capacity from the existing overloaded cell. Block 250 then terminates the process.

Figure 3:
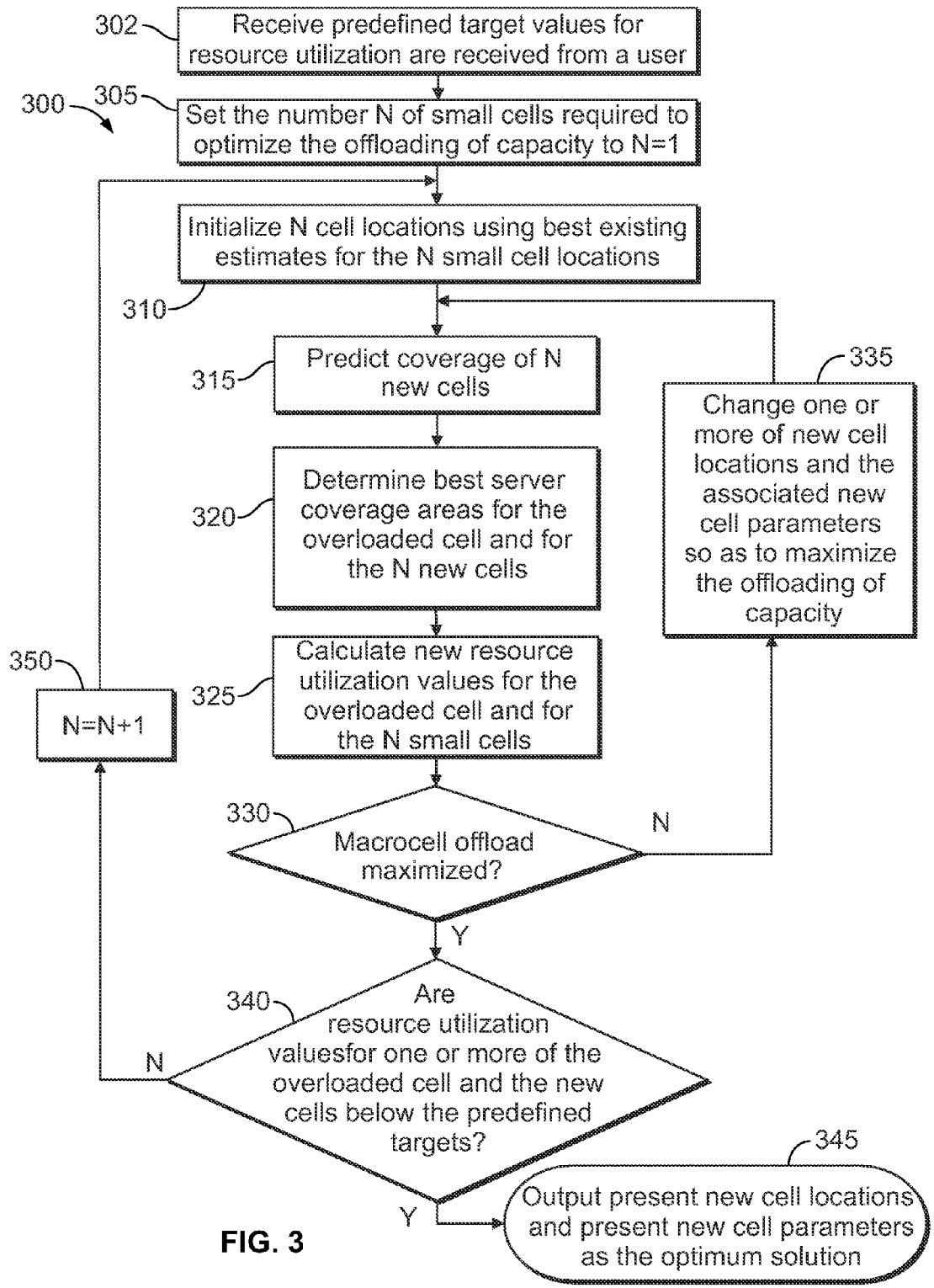
FIG. 3 is a more detailed flowchart showing steps in a method for estimating how best to position a new cell within an existing overloaded cell that is running out of capacity in a wireless network so as to optimize the offloading of capacity from the existing overloaded cell.

FIG. 3 is a more detailed flowchart showing steps in a method for estimating how best to position a new cell within an existing overloaded cell that is running out of capacity in a wireless network so as to optimize the offloading of capacity from the existing overloaded cell. FIG. 3 essentially shows details of sub-steps comprised in step 250 of FIG. 2.

According to embodiments of the method, the overloaded cell may be either an overloaded macrocell or an overloaded small cell.

In block 302, predefined target values for resource utilization are received from a wireless network operator or other user.

In block 305, the number N of new cells required to optimize the offloading of capacity from the existing overloaded cell is provisionally set to N=1. Block 305 then transfers control to block 310.

In block 310, a number N of new cell locations is initialized using the best existing estimates for the N new cell locations. The estimates for the N new cell locations are computed using one or more of coordinates within the overloaded cell coverage area, antenna height, antenna pattern, antenna gain, transmit power, handoff parameters, and cell selection bias parameters. Block 310 then transfers control to block 315.

In block 315, for N given new cell locations and antenna parameters, the new cell coverage is predicted. This may be done by interfacing with a Coverage Prediction Tool (CPT). Commercially available Coverage Prediction Tools include Atoll, manufactured by Forsk (www.forsk.com) of Blagnac, France, and Mentum Planet, manufactured by Mentum Planet of Velizy, France. Block 315 then transfers control to block 320.

In block 320, best server coverage areas are determined for the overloaded cell and for the N new cells. Depending on the access technology, this step may be based on one or more of power level differences, SNR differences, and cell selection parameters.

This step may also be performed by interfacing with a CPT. The CPT may use one or more of predicted and measured coverage for the overloaded cell signal to determine one or more of the PHY Layer data rates and resource utilization figures for calls after the new cell is added to the overloaded cell coverage area. For example, the CPT may use one or more of data derived from drive tests and previously geolocated calls including associated RF measurements. Calls being made in the overloaded cell coverage area may require different numbers of physical resources after the new cells are added relative to the requirements prior to the addition of the new cells since the SNR conditions may change due to the new cells. For example, in the LTE setting, the number of PRBs may change due to the addition of the new cells. Block 320 then transfers control to block 325.

In block 325, the new resource utilization values for the overloaded cell and for the N new cells are calculated. In some embodiments, the resource utilization information may be readily available in one or more of the NC call logs, the Network Probe logs and the PM logs. If not, in OFDMA systems (which as mentioned above, cover TDMA and FDMA systems as special cases) the resource utilization $Util_{OFDMA}(j)$ for the j-th call may be calculated from;

$$Util_{OFDMA}(j) = Call\ Data\ Volume\ (j)/Average\ Bits\ Per\ Resource\ Unit\ (j) \quad (1)$$

In formula (1), Call Data_Volume(j) is the data volume during the j-th call (for example, the data volume in number of bits transmitted or received), which is usually available in at least one of the NC call logs, the Network Probe logs and the PM logs because of accounting and charging. The variable Average_Bits-Per-Resource-Unit(j) represents the average number of information bits received or transmitted per one resource utilization unit during the j-th call.

For example, in the LTE setting, a resource utilization unit could be a Physical Layer Resource Block. For example, in the 1xEV-DO setting, a resource utilization unit could be a slot. Averaging of resource utilization over the duration of the call may be advisable if the RF conditions change during the call, for example, due to fading of the signal. Averaging of resource utilization over the duration of the call may be advisable if the number of information bits varies from one resource unit to another, for example, due to a variable amount of overhead for pilots. If a resource utilization unit is not directly available in the logs, it may be calculated based on one or more of information logged for the call relating to Modulation and Coding Scheme (MCS), multiple-input-multiple-output (MIMO) antenna transmission mode information, and Automatic Repeat Request (ARQ) statistics if supported. If not directly available in the logs, MCS information may be deduced from the RF quality feedback information, for example, in the 1xEV-DO setting, from a Data Rate Control Index, and for example, in the LTE setting, from Channel Quality Indicators (CQI).

Alternatively, it may be possible to calculate the resource utilization $Util_{OFDMA}(j)$ from:

$$Util_{OFDMA}(j) = \frac{Call\ Date\ Volume(j)}{PHY\ Data\ Rate(j)} \cdot Available\ Resources \quad (2)$$

Where, for given RF conditions, PHY_Data_Rate(j) is the maximum supportable Physical Layer information bit data rate for the j-th call, for example, in bits per second, and Available_Resources is the number of PHY Layer resource units available per second. Available_Resources varies depending on the system. For example, with an 1xEV-DO downlink, Available_Resources is equal to 600 slots per second. In the LTE setting, assuming for example a 10 MHz bandwidth allocation in the downlink and a 10 MHz bandwidth allocation in the uplink, Available_Resources would be equal to approximately 50,000 PRBs per second per direction, that is, for one of the uplink and the downlink.

For voice-only systems, PHY Data Rate is constant for all users. For example, for the original GSM full-rate voice coder, for the original Global System for Mobile Communications (GSM) full-rate voice coder, PHY_Data_Rate is equal to 13 kbps, and Call_Data_Volume is equal to the product of PHY_Data_Rate and the call length, assuming no discontinuous transmission. The resource utilization determined from formula (1) then is proportional to the call length, which is in turn proportional to the traffic intensity in Erlangs.

In CDMA systems, since the shared resource over time is power, the analogous resource utilization criterion may be based on total cell energy transmitted during the j-th call, i.e.

$$Util_{CDMA}(j) = P_{TX\ Cell}(j) \cdot Call\ Legth(j) \quad (3)$$

The variable Call_Length(j) is typically available in the call logs, and the portion $P_{TX\ Cell}(j)$ of the cell transmit power that is devoted to the j-th call often is available in the call logs.

If the portion $P_{TX\ Cell}(j)$ of the cell transmit power that is devoted to the j-th call is not available, sometimes it may be calculated from one or more of the reported SNR for the j-th call, the measured or estimated path loss Path_Loss(j) (<1) for the j-th call, and the total noise and interference power $P_{N+I}(j)$ measured by the MT for the j-th call. The portion $P_{TX\ cell}(j)$ of the cell transmit power that is devoted to the j-th call may be expressed as:

$$P_{TX\ Cell}(j) = SNR(j) \cdot P_{N+I}(j) \cdot Path\ Loss\ (j) \quad (4)$$

For most CDMA technologies, the MTs report or have an option to report the three variables from equation (3), that is, $util_{CDMA}(f)$, $P_{TX\ Cell}(j)$, and Call_Length(j) One or more of the three variables may be reported directly. Alternatively, one or more of the three variables may be reported indirectly, by reporting other measurements based upon which one or more of the three variables may be calculated. These other measurements may, for example, be comprised in the call logs.

Equation (3) can be usefully rewritten in the form:

$$P_{TXCell}(j) = \left(\frac{E_b}{N_0}\right)_j \cdot \frac{PHY\ Data\ Rate(j)}{W} \cdot P_{N+1}(j) \cdot Path\ Loss(j) \quad (5)$$

where $(E_b/N_o)$; is the ratio of the energy-per-bit to the total noise-plus-interference-density, and W is the system bandwidth, which typically is constant across MTs. The parameter $(E_b/N_o)$, may vary to some extent depending on the chosen PHY_Data_Rate(j) because different MCS schemes may exist for different rates. MCS's may also vary to some extent depending on one or more of multipath conditions and speed conditions of the MTs. The power $P_{N+I}(j)$ can vary dramatically from one MT location to another. If both can be assumed to be approximately constant for all terminals, however, then the resource utilization for a terminal in CDMA systems would be proportional to the product of the data rate and the path loss, and using these two parameters as a criterion for finding the optimum location for capacity relief has been proposed previously for UMTS systems.

Embodiments of the method may start from the binned geographical maps showing averaged resource utilization, call volumes and various RF parameters for all calls that fall within the bin, rather than from the individual calls. The size of these bins can be, for example, anywhere from approximately 10 meters by 10 meters to approximately 200 meters by 200meters. Dimensions may depend on one or more of the geo-location accuracy and the intended application. For example, finer resolution may be needed for placing picocells than for placing microcells.

The overloaded cell offload is then determined as $$Overloadedcell\ Offload = N\ Small\ Cell\ Offload - Overloadedcell\ Utilization\ Delta \quad (6)$$

where Overloadedcell_Offload is the capacity offloaded from the overloaded cell, where N_Small_Cell_offload is the sum of physical resources of the overloaded cell that were originally used within the best server areas of the N new cells, and Overloadedcell_Utilization_Delta is the difference in physical resources utilized by the overloaded cell before and after the deployment of the new cells. Overloadedcell_Utilization_Delta typically is a positive number since the new cells will typically generate additional interference and therefore the overloaded cell will typically use more physical resources for calls within the new area of the overloaded cell than would be used in the case in which no new cells are added. Block 325 then transfers control to block 330.

According to alternative embodiments of the invention, the offload from the overloaded cell may be defined as the difference $$\text{Overloadedcell\_Offload} = \text{physres}_{min} - \text{physres}_{actual}, \quad (7)$$

where $\text{physres}_{min}$ is the theoretical minimum number of resources used under ideal transmission conditions and $\text{physres}_{actual}$, is the actual quantity of resources used. The quantity $\text{physres}_{actual}$ includes the change in resources used before and after placing new cells, in analogy to the Overloadedcell_Utilization_Delta described above.

For example, in the LTE setting, physical resources used correspond to PRBs, and the offload from the overloaded cell may be defined as the difference $$\text{Overloadedcell\_Offload} = \text{PRB}_{min} - \text{PRB}_{actual}, \quad (8)$$

where $\text{PRB}_{min}$ is the theoretical minimum number of PRBs used under ideal transmission conditions and $\text{PRB}_{actual}$, is the actual quantity of PRBs used.

In block 330, the method determines whether the capacity offloaded from the overloaded cell by the new cells is maximized. If the offload is not maximized, then block 330 transfers control to block 335. If the offload is maximized, then block 330 transfers control to block 340.

In block 335, one or more of new cell locations and the associated new cell parameters for one or more of the N new cells are changed so as to maximize the offloading of capacity from the overloaded cell. New cell parameters may comprise one or more of coordinates within the overloaded cell coverage area, antenna height, antenna radiation pattern, antenna gain, transmit power, handoff parameters, and other cell selection parameters The method used in block 335 to adjust the new cell locations may be one or more of iterative methods well known from numerical analysis. For example, one available method is a simplex search, also known as a steepest descent search. As another example, assuming that the optimum new cell locations are determined within a given tolerance X, in some embodiments an exhaustive search over all points on an X by X meters grid within the overloaded cell coverage area may be used. For example, in this case, X may equal ten meters.

Those skilled in the art will recognize that many different embodiments of this search procedure are possible, depending on the smoothness of the overall resource utilization function, the required tolerance for the new cell location, the achieved accuracy of geo-location for the individual calls within the overloaded cell coverage area, and the like. Block 335 then transfers control to block 315.

In block 340, the method determines whether resource utilization values for one or more of the overloaded cell and the new cells are below the predefined targets.

If the answer is that all the targets are met, block 340 transfers control to block 345.

In block 345, the method outputs the present new cell locations and present new cell parameters as the optimum solution in block 345. Block 345 then terminates the process.

If the answer to the question posed in block 340 is that the target resource utilization values were not satisfied, block 340 transfers control to block 350.

In block 350, the method increases by one the number of new cells, given that the prior value of N appears insufficient to maximize the offloading of capacity from the overloaded cell. Block 350 then transfers control to block 310.

Figure 4:
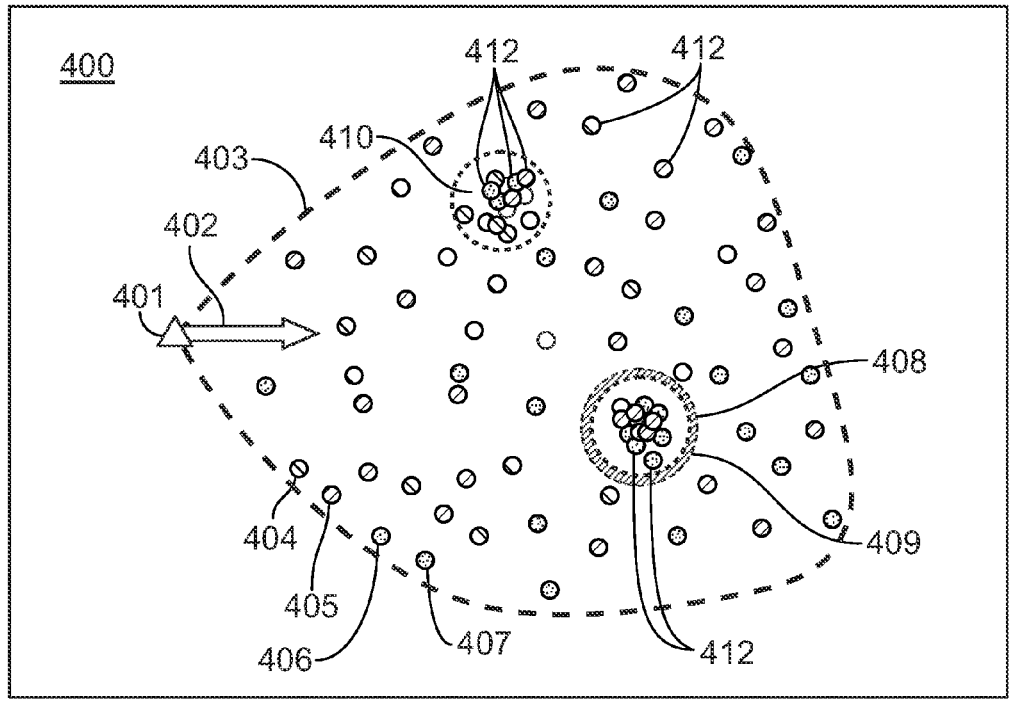
FIG. 4 is a drawing of an overloaded cell in a wireless network whose capacity is to be offloaded by positioning within the overloaded cell a new cell that utilizes discrete geolocated calls so as to optimize the offloading of capacity from the existing overloaded cell.

Alternatively, various approximate solutions may be also used in blocks 315 to 325. For instance, in practice, new cells often have a very limited cell range due to one or more of relatively low power, low antenna heights and aggressive antenna down-tilting. New cell signals tend to fade relatively sharply from one or more of new cells located indoors, and new cells located outdoors and having heights below the average clutter heights. Therefore, a relatively narrow area may exist at the edge of the new cells' coverage area that has a significant impact upon the SNR in the overloaded cell. Such an area is indicated in FIG. 4 as the hatched area 409.

Thus in many cases, in block 315 it may be also possible to use an estimate of the typical cell radius. For example, a typical new cell radius would be between approximately 100 meters and approximately 200 meters. In block 320, it may be possible to redefine the cell radius of the new cells as, for example, approximately 200 meters. We could then assume that calls within this area will be served by a new cell. In block 320, it may also be possible to assume that the vast majority of calls outside the new cell area will be served by the overloaded cell under approximately the same RF conditions. If these approaches are used, the rates and resource utilization figures for the overloaded cell will not change much after the new cell is deployed. Accordingly, under this approach, block 325 may be omitted, and block 320 will pass control to block 330.

In this example, blocks 315 to 325 entail utilizing all bins within the overloaded cell coverage area.

Those skilled in the art will recognize that embodiments of the method 300 can be used to relieve a traffic hotspot located at or near the border between two or more overloaded cells. In this case, the best positions of the new cells within the combined coverage area of two or more overloaded cells that are running out of capacity will be optimized. This can be accomplished by optimizing one or more of new cell locations and new cell parameters. Accordingly, in this set of embodiments of the invention, the capacity of multiple overloaded cells that are running out of capacity may be offloaded.

Furthermore, those skilled in the art will also recognize that embodiments of the method 300 can be used to deploy two or more new cells within the coverage area of one or more overloaded cells that are running out of capacity. Once the optimum new cell location is determined by the method 300, if the offloaded capacity is found to be smaller than needed, the method can loop through blocks 315 to 330, searching to optimize the offloaded capacity by changing two new cell locations. If this also proves insufficient, then a third new cell location can be changed, and so on.

In order to determine which overloaded cells of a network should have their capacity offloaded by new cells, a ranking list of overloaded cells can be created based on overloaded cell resource utilization. Overloaded cells that are higher in the ranking list should have their capacity offloaded before the capacity of overloaded cells lower on the list is offloaded.

For example, in the LTE setting, the ranking list could be based on PRB usage relative to available PRBs. The PRB offload method for LTE can either be used for downlink or uplink. In case of uplink, the PRB usage on uplink is analyzed and the new cell maximizes the offloading of capacity for the uplink PRBs.

For example, in the WiMAX setting, the ranking list could be based on usage of one or more of clusters and tiles relative to available numbers of one or more of clusters and tiles. For example, in the UMTS Third-Generation, 144 kbps Wireless Technology (UMTS/3G1X) setting, the ranking list could be based on the portion of the used transmit power relative to the total available cell power for the overloaded cell. Alternatively, one or more other load criteria could be used to estimate an overloaded cell's resource utilization. Examples of possible load criteria include the number of connected users, the data volume in uplink, the data volume in downlink, the processor load, and the memory load.

For technologies other than LTE, uplink parameters other than PRBs may be used to analyze uplink resource utilization. For example, in the UMTS/3G1x setting, the noise rise may be used.

Alternative embodiments of the invention place greater emphasis on traffic levels. For example, in the LTE setting, according to these embodiments, a PRB offload can be weighted by a factor dependent on the traffic levels. For example, PRB_offload can be multiplied by the call data volume. For example, PRB_offload can be multiplied by the call data volume in bytes.

Alternative embodiments of the invention place greater emphasis on efficiency relative to traffic levels. For example, in the LTE setting, according to these embodiments, PRB_offload can be weighted by calculating the average PRB usage per unit of data volume.

Alternative embodiments of the invention place greater emphasis on minimizing physical resource waste, that is, on finding the optimal way to avoid using physical resources that could have been saved under more ideal transmission conditions. These alternative embodiments may be less focused on minimizing total resource utilization and more focused on improving cell efficiency.

For example, a data call may use 10 kilobytes of data if this data is transmitted with the highest modulation scheme and the best coding scheme available, which used 1,000 PRBs. For example, if the transmission were using one or more of a lower modulation and a lower coding scheme, it might use 5,000 PRBs. In this example, the "PRB waste" is 4,000 PRBs.

justify positioning the new cell there. In that event, a location will be found according to embodiments of the invention where traffic is medium to high and the physical resource waste is high. Under the approach of maximizing the efficient use of resources, the new cell may be placed where the waste of physical resources is highest, which is more likely to be in a high traffic location at the edge of the cell.

Accordingly, according to embodiments of the invention, it will sometimes happen that the two embodiments will produce different results in terms of which positions for the new cells are optimum. As a purely conceptual example with illustrative but non-representative numbers, for example, we may assume an LTE setting with a one megabyte (1 MB) data volume and $PRB_{min}=1,000$. Four possible locations may be explored with the following exemplary results:

Location A: Position: edge of overloaded cell. Data volume: 1 MB. A representative physical resource waste may be approximately 10,000 PRBs, and $PRB_{actual}=11,000$.

Location B: Position: middle of overloaded cell. Data volume: 7 MB. Physical resource waste=5,000 MB. $PRB_{actual}=12,000$.

Location C: Position: intermediate between positions A and B. Data volume: 5 MB. Physical resource waste=12,000 MB. $PRB_{actual}=17,000$.

Location D: Close to cell tower. Data volume: 20 MB. Physical resource waste=5,000 MB. $PRB_{actual}=25,000$.

Under the first set of embodiments, emphasizing the offloading of resources from the overloaded cell, the order of preference for the position of the new cell would be first D, then C, then B, then A.

Under the second set of embodiments, emphasizing the minimization of physical resource waste, the order of preference would be first C, then A, and finally a tie between B and D.

TABLE 1 summarizes the four possible new cell positions that are analyzed in this example and the results of the analysis of this simplified example.

| Scenario | New Cell Position Relative to Overloaded Cell | Data Volume (MB) | Waste (PRBs) | $PRBs_{actual}$ | Preference (maximizing offload) | Preference (minimizing waste) |
|---|---|---|---|---|---|---|
| A | Edge | 1 | 10,000 | 11,000 | 4 | 2 |
| B | Middle of overloaded cell | 7 | 5,000 | 12,000 | 3 | 3 (tie) |
| C | Intermediate between A and B | 5 | 12,000 | 17,000 | 2 | 1 |
| D | Close to cell tower | 20 | 5,000 | 25,000 | 1 | 3 (tie) |

According to embodiments of the invention, therefore, one or more of the offload from the overloaded cell and the efficient use of resources may be maximized. Equation (7), corresponding to maximization of the offloading of capacity from the overloaded cell, may for example be applied in the case of a cell tower located in the middle of a busy shopping mall, in which the critical importance of offloading capacity is clear. Such a cell tower can handle traffic very efficiently as it is located close to the shopping mall, which is a high traffic hot spot, but still will consume many physical resources. Under this approach, a new cell would be positioned next to the macrocell to offload capacity from the overloaded cell.

Equation (8), corresponding to maximizing the efficient use of resources, may for example be applied in the case of the same shopping mall located in a high traffic hot spot. Physical resource waste is typically highest at the edge of the cell since the interference from the neighboring cells is highest there. In some cases, the traffic at the edge of the cell may be very low, so that the physical resource waste is not high enough to For UMTS/3G1x settings, waste could be defined as power waste, that is, the difference between the lowest power needed to transmit user bytes under ideal conditions and the actual power needed to transmit the user bytes under real world conditions.

Those skilled in the art will recognize that various other variations of the basic method 300 can be devised, depending on the type of new cells used and depending on deployment conditions.

FIG. 4 is a drawing of an overloaded cell in a wireless network whose capacity is to be offloaded by positioning within the overloaded cell a new cell that utilizes discrete geolocated calls so as to optimize the offloading of capacity from the existing overloaded cell.

The overloaded cell 401 has an antenna pointing angle 402 and has a boundary traced by overloaded cell coverage area border 403. According to embodiments of the invention, the overloaded cell 401 may be either an overloaded macrocell 401 or an overloaded new cell 401.

Calls are depicted as circles with shading proportional to the calculated resource utilization for each call. For example, calls 404 to 407 have progressively higher resource utilizations. Area 408 represents an optimum new cell, since the sum of resource utilizations within the area 408 is the largest.

By contrast, area 410 does not represent an optimum new cell. Although area 410 contains more calls 412 than area 408 contains, a new cell placed at location 410 would offload fewer resources from the overloaded cell 401 than would a new cell placed at location 408. This example illustrates that sometimes a new cell 408 containing fewer calls 412 may nevertheless offload more resources than another new cell 410 containing more calls 412.

Figure 5:
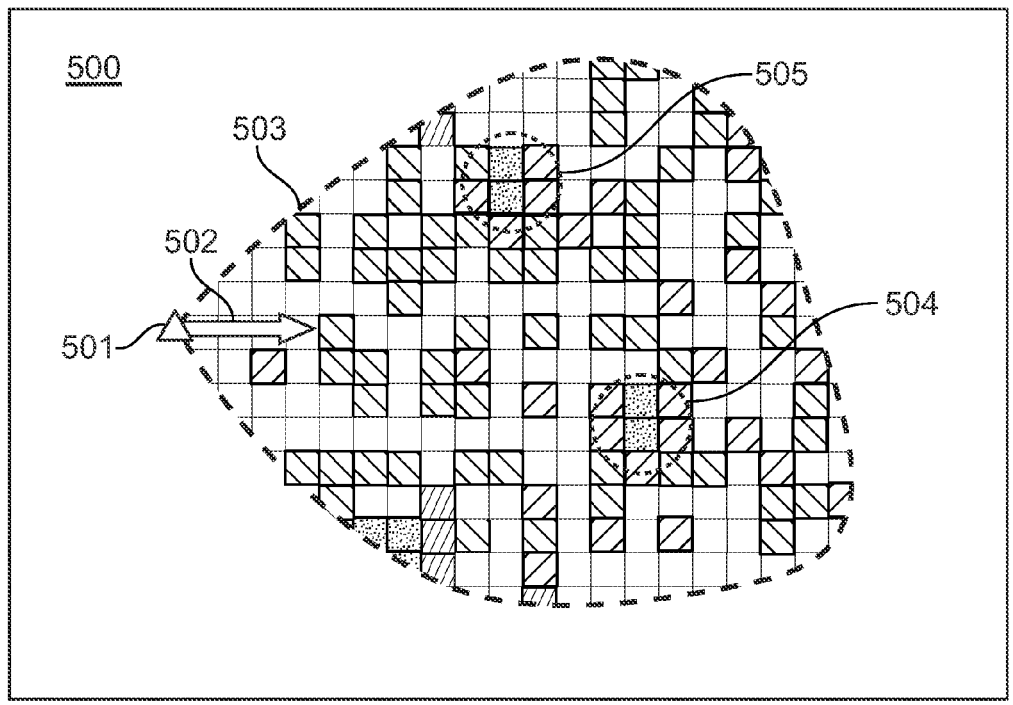
FIG. 5 is a drawing of an overloaded cell in a wireless network whose capacity is to be offloaded by positioning within the overloaded cell a new cell that utilizes binned maps of geolocated calls, binned subscriber parameters, binned traffic parameters and binned RF parameters within the overloaded cell coverage area so as to optimize the offloading of capacity from the existing overloaded cell.

FIG. 5 is a drawing of an overloaded cell in a wireless network whose capacity is to be offloaded by positioning within the overloaded cell a new cell that utilizes binned maps of geolocated calls, binned subscriber parameters, binned traffic parameters and binned RF parameters within the overloaded cell coverage area so as to optimize the offloading of capacity from the existing overloaded cell.

The overloaded cell 501 has an antenna pointing angle 502 and has a boundary traced by overloaded cell coverage area border 503. According to embodiments of the invention, the overloaded cell 501 may be either an overloaded macrocell 501 or an overloaded small cell 501.

Binned maps are depicted as squares with shading proportional to the calculated resource utilization for each call. For example, area 504 has a higher resource utilization than area 505. Area 504 thus represents an optimum new cell, since the sum of resource utilizations within the areas 504 and 505 is the largest.

By contrast, area 505 does not represent an optimum new cell. A new cell placed at location 505 would offload fewer resources from the overloaded cell 501 than would a new cell placed at location 504.

While the above representative embodiments have been described with certain components in exemplary configurations, it will be understood by one of ordinary skill in the art that other representative embodiments can be implemented using different configurations and/or different components. For example, the method for new cell planning can be implemented in many different ways. The embodiment depicted in FIG. 1 comprises a standalone computing and processing NCPT 119, but those familiar with the art will recognize that the computing and processing NCPT 119 may, for example, be comprised in one or more of the NC 104, the LBS Server 112, and the Network Probe 115, and possibly other elements.

As another example, in block 315 it may be also possible to use an estimate of the typical cell radius. For example, in block 320, it may be possible to assume that calls within the typical cell radius will be served by a new cell. For example, block 320, it may also be possible to assume that the majority of calls outside the new cell area will be served by the overloaded cell under approximately the same RF conditions. Under this approach, in block 325 the resource utilization is calculated for calls within the best server area of the new cell. Since under this approach, we may neglect the overloaded-cell_Utilization_Delta. Therefore, the new cell traffic offload is equal to the overloaded cell offload, and block 320 will pass control to block 330.

As another example, in blocks 315 to 330, it may be possible to utilize binned maps of geolocated calls, binned subscriber parameters, binned traffic parameters and binned RF parameters within the overloaded cell coverage area so as to optimize the offloading of capacity from the existing overloaded cell.

As still another example, the best positions of the new cells within the combined coverage area of two or more overloaded cells that are running out of capacity may be optimized by optimizing one or more of new cell locations and new cell parameters.

As yet another example, embodiments of the method can be used to deploy two or more new cells within the coverage area of one or more overloaded cells that are running out of capacity. Once the optimum new cell location is determined, if the offloaded capacity is found to be smaller than needed, the method can loop through blocks 315 to 330, searching to optimize the offloaded capacity by changing two new cell locations.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the appended.

What is claimed is:

1. A method for estimating how best to position a new cell within a wireless network having an existing overloaded cell that is running out of capacity so as to optimize the offloading of capacity from the existing overloaded cell, comprising:
   filtering call records to keep calls made during a selected capacity planning interval calls, wherein the kept calls are performing one or more of sending data to the overloaded cell and receiving data from the overloaded cell;
   geo-locating the sending and receiving calls;
   calculating one or more resource utilization values for one or more geo-located sending and receiving calls; and
   determining coordinates for an optimum new cell location based upon the calculated resource utilization values so as to optimize the offloading of capacity from the existing overloaded cell.

2. The method of claim 1, wherein the step of determining comprises maximizing a total of resource utilization values that are offloaded from the overloaded cell.

3. The method of claim 2, wherein the step of determining further comprises optimizing one or more new cell parameters, wherein the new cell parameters comprise one or more of coordinates within the overloaded cell coverage area, antenna height, antenna radiation pattern, antenna gain, transmit power, handoff parameters, and other cell selection parameters.

4. The method of claim 1, wherein the step of determining comprises maximizing a total of weighted resource utilization values, where the weights are a function of the traffic levels.

5. The method of claim 4, where the weights are proportional to the traffic levels.

6. The method of claim 5, where the weights are equal to the call data volumes in bytes.

7. The method of claim 1, wherein the wireless network is a Long-Term Evolution (LTE) network, and wherein the resource utilization values are measured in Physical Resource Blocks (PRBs).

8. The method of claim 1, wherein the resource utilization values comprise physical layer (PHY) resource utilization values.

9. The method of claim 1, wherein the determining step comprises using one or more of binned maps of the geo-located calls, binned subscriber parameters, binned traffic parameters and binned radio frequency (RFO parameters).

10. The method of claim 1, wherein the filtering step comprises filtering call records to keep only calls made during a selected capacity planning interval calls, wherein the kept calls are performing one or more of sending data to the overloaded cell and receiving data from the overloaded cell.

11. The method of claim 1, wherein geo-locating the sending and receiving calls comprises geo-locating all sending and receiving calls.

12. The method of claim 1, wherein the calculating step comprises calculating one or more resource utilization values for all geo-located sending and receiving calls.

13. The method of claim 1, wherein the determining step comprises determining the optimized offloading of capacity using the equation:

Overloadedcell Offload=N Small Cell Offload−Overloadedcell Utilization Delta where Overloadedcell_Offload is the capacity offloaded from the overloaded cell, N_Small_Cell_Offload is the sum of physical resources of the overloaded cell that were originally used within the best server areas of the N new cells, and Overloadedcell_Utilization_Delta is the difference in physical resources utilized by the overloaded cell before and after the deployment of the new cells.

14. The method of claim 13, wherein the step of determining the capacity to be offloaded comprises using the equation:

Overloadedcell Offload=physres$_{min}$−physres$_{actual}$, where physres$_{min}$ is the theoretical minimum number of resources used under ideal transmission conditions and physres$_{actual}$, is the actual quantity of resources used.

15. The method of claim 13, wherein the step of determining the capacity to be offloaded comprises using the equation:

Overloadedcell Offload=PRB$_{min}$−PRB$_{actual}$.

16. A method for estimating how best to position a new cell within a wireless network having an existing overloaded cell that is running out of capacity in a wireless network so as to optimize the offloading of capacity from the existing overloaded cell, comprising:
  filtering call records to keep calls made during a selected capacity planning interval calls, wherein the kept calls are performing one or more of sending data to the overloaded cell and receiving data from the overloaded cell;
  geo-locating the sending and receiving calls;
  calculating one or more resource utilization values for one or more geo-located sending and receiving calls;
  initializing N new cell locations using new cell parameters; predicting new cell coverage for the N new cell locations; determining best server areas for the overloaded cell and for one
  or more of the N new cells;
  computing resource utilization values for the overloaded cell and for one or more of the N new ells;
  determining the capacity to be offloaded from the overloaded cell; determining that the offloaded capacity is maximized;
  determining that resource utilization values for the overloaded cell and for the N new cells are below predefined target values; and
  outputting the N new cell locations and their cell parameters as an optimum solution based upon the determined resource utilization values.

17. The method of claim 16, wherein the step of determining the capacity to be offloaded comprises using the equation:

Overloadedcell Offload=N Small Cell Offload−Overloadedcell Utilization Delta where Overloadedcell_Offload is the capacity offloaded from the overloaded cell, N_Small_Cell Offload is the sum of physical resources of the overloaded cell that were originally used within the best server areas of the N new cells, and Overloadedcell_Utilization_Delta is the difference in physical resources utilized by the overloaded cell before and after the deployment of the new cells.

18. The method of claim 16, wherein the step of determining the capacity to be offloaded comprises using the equation:

Overloadedcell Offload=physres$_{min}$−physres$_{actual}$, where physres$_{min}$ is the theoretical minimum number of resources used under ideal transmission conditions and physres$_{actual}$, is the actual quantity of resources used.

19. The method of claim 16, wherein the new cell parameters comprise one or more of coordinates within the overloaded cell coverage area, antenna height, antenna radiation pattern, antenna gain, transmit power, handoff parameters, and other cell selection parameters.

20. A non-transitory computer-readable storage medium comprising instructions for estimating how best to position a new cell within a wireless network having an existing overloaded cell that is running out of capacity so as to optimize the offloading of capacity from the existing overloaded cell, wherein the instructions, upon execution, cause a processor to perform actions comprising:
  filtering call records to keep calls made during a selected capacity planning interval calls, wherein the kept calls are performing one or more of sending data to the overloaded cell and receiving data from the overloaded cell;
  geo-locating the sending and receiving calls;
  calculating one or more resource utilization values for one or more geo-located sending and receiving calls; and
  determining coordinates for an optimum new cell location based upon the calculated resource utilization values so as to optimize the offloading of capacity from the overloaded cell.

* * * * *